United States Patent
Han et al.

(10) Patent No.: US 10,949,650 B2
(45) Date of Patent: Mar. 16, 2021

(54) FACE IMAGE DE-IDENTIFICATION APPARATUS AND METHOD

(71) Applicant: ELECTRONICS AND TELECOMMUNICATIONS RESEARCH INSTITUTE, Daejeon (KR)

(72) Inventors: Jong-Wook Han, Daejeon (KR); Geonwoo Kim, Daejeon (KR); So Hee Park, Daejeon (KR); Seon Ho Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/574,531

(22) Filed: Sep. 18, 2019

(65) Prior Publication Data

US 2020/0104574 A1 Apr. 2, 2020

(30) Foreign Application Priority Data

Sep. 28, 2018 (KR) .......................... 10-2018-0116572

(51) Int. Cl.
*G06K 9/00* (2006.01)
*G06K 9/62* (2006.01)
*G06T 11/00* (2006.01)

(52) U.S. Cl.
CPC ..... *G06K 9/00275* (2013.01); *G06K 9/00228* (2013.01); *G06K 9/6215* (2013.01); *G06K 9/6255* (2013.01); *G06T 11/00* (2013.01)

(58) Field of Classification Search
CPC ......... G06T 11/00; G06T 13/00; G06T 13/20; G06T 13/40; G06T 13/80; G06T 15/00; G06T 2207/30201; G06K 9/00228; G06K 9/00275; G06K 9/00288; G06K 9/6215; G06K 9/6255; G06K 20/00; G06N 20/00
USPC ........................................................ 345/441
See application file for complete search history.

(56) References Cited

U.S. PATENT DOCUMENTS

| | | | |
|---|---|---|---|
| 8,831,379 B2* | 9/2014 | Wen | G06K 9/00228 382/284 |
| 9,245,369 B2 | 1/2016 | Joo et al. | |
| 2010/0079491 A1* | 4/2010 | Nonaka | G06T 11/00 345/630 |
| 2011/0148868 A1 | 6/2011 | Chang et al. | |

(Continued)

FOREIGN PATENT DOCUMENTS

| KR | 10-1881391 B1 | 7/2018 |
|---|---|---|
| KR | 10-1904924 B1 | 10/2018 |

OTHER PUBLICATIONS

Blažević, Martin, Karla Brkić, and Tomislav Hrkać. "Towards reversible de-identification in video sequences using 3d avatars and steganography." arXiv preprint arXiv:1510.04861 (2015) (Year: 2015).*

*Primary Examiner* — Sae Won Yoon
(74) *Attorney, Agent, or Firm* — Rabin & Berdo, P.C.

(57) ABSTRACT

A face image de-identification apparatus and method are disclosed. The face image de-identification apparatus may include an emoji generator configured to generate a first emoji image including facial feature information corresponding to a face image using the face image stored in a database, and an image inserter configured to insert the first emoji image into the database by replacing the first emoji image with the face image.

11 Claims, 4 Drawing Sheets

(56) References Cited

U.S. PATENT DOCUMENTS

| | | | |
|---|---|---|---|
| 2014/0247996 A1* | 9/2014 | Lin | G06K 9/6211 |
| | | | 382/218 |
| 2016/0086304 A1* | 3/2016 | Hsieh | G06T 7/75 |
| | | | 382/201 |
| 2016/0219006 A1 | 7/2016 | Yuen et al. | |
| 2017/0076209 A1* | 3/2017 | Sisk | G05B 23/024 |
| 2017/0178287 A1* | 6/2017 | Anderson | G06K 9/00228 |
| 2018/0075289 A1* | 3/2018 | Zhang | G06K 9/6262 |
| 2018/0239975 A1* | 8/2018 | Tamrakar | G06K 9/00261 |

* cited by examiner

FACE IMAGE DE-IDENTIFICATION APPARATUS AND METHOD

CROSS-REFERENCE TO RELATED APPLICATION

This application claims priority to and the benefit of Korean Patent Application No. 10-2018-0116572 filed in the Korean Intellectual Property Office on Sep. 28, 2018, the entire contents of which are incorporated herein by reference.

BACKGROUND OF THE INVENTION

(a) Field of the Invention

The present invention relates to a face image de-identification apparatus and method.

(b) Description of the Related Art

In recent years, the use of deep learning technology in the field of intelligent video surveillance technology has been rapidly increasing, and in some applications, successful technology development has been going beyond human cognitive ability. In order to develop face recognition technology based on deep learning, a vast database (DB) is required. However, when the constructed learning DB is exposed to the outside, a privacy invasion problem may occur. As a result, securing learning DBs is difficult. Accordingly, even if images collected for the learning DB are leaked to the outside, there is a demand for a protection technology such that personal information is not exposed and that can also be used as a learning DB.

In order to solve the privacy invasion problem that may occur when a face image is exposed, a masking technique or an encryption technique for image information is used. Even if these existing technologies are applied to the face learning DB, it is not a fundamentally safe measure because the face image is used through the unmasking or decryption process for the face learning. In addition, since unmasking or decoding should be performed at every learning event, it takes a long time to decode a large face image in real time. Therefore, these technologies have practical limitations in application to a learning DB.

In order to protect the learning DB in the deep learning face recognition technology, it is necessary to maintain the facial feature information of the face image used as the learning DB and to protect the human face from being recognized even if it is leaked to the outside. That is, there is a need for a technology capable of decoding a face only once at the time of building an initial learning DB, and thereafter using the converted face image as a learning face image.

SUMMARY OF THE INVENTION

The present invention provides a face image de-identification apparatus and method capable of protecting a face image for learning.

According to an exemplary embodiment of the present invention, a face image de-identification apparatus is provided. The face image de-identification apparatus may include an emoji generator configured to generate a first emoji image including facial feature information corresponding to a face image using the face image stored in a database, and an image inserter configured to insert the first emoji image into the database by replacing the first emoji image with the face image.

The emoji generator may include an emoji conversion deep learning model for generating the first emoji image using the face image A second emoji image may be generated by applying an emoji conversion deep learning network to a reference face image, and the emoji conversion deep learning model may be constructed by learning the emoji conversion deep learning network so that a similarity degree between facial feature information corresponding to the second emoji image and facial feature information corresponding to the reference face image is higher than a predetermined threshold value.

The emoji conversion deep learning network may be a generator of a generative adversarial network (GAN).

The face image de-identification apparatus may further include an image extractor configured to extract an original image from the database, an object detector configured to detect an image of a person who is an object in the original image, and a face image detector configured to detect the face image from the image of the person.

The reference face image may be a face image that has been disclosed from the outside.

According to another exemplary embodiment of the present invention, a method for de-identifying a face image by a face image de-identification apparatus is provided. The method may include constructing an emoji conversion deep learning model to generate a first emoji image including facial feature information corresponding to the face image, generating the first emoji image by applying the emoji conversion deep learning model to the face image, and replacing the face image with the first emoji image.

The constructing the emoji conversion deep learning model may include generating a second emoji image by applying an emoji conversion deep learning network to a reference face image, extracting facial feature information corresponding to the second emoji image, extracting facial feature information corresponding to the reference face image, calculating a similarity degree between the facial feature information of the second emoji image and the facial feature information of the reference face image, and learning the emoji conversion deep learning network until the similarity degree becomes higher than a predetermined threshold value.

The emoji conversion deep learning network may be a generator of a generative adversarial network (GAN).

The calculating the similarity degree may include calculating the similarity degree by applying a discriminator of a generative adversarial network (GAN).

The method may further include extracting an original image from a database, detecting an image of a person who is an object in the original image, and detecting the face image from the image of the person.

According to another exemplary embodiment of the present invention, a face image de-identification apparatus for de-identifying a face image is provided. The face image de-identification apparatus may include an emoji generator configured to generate an emoji image by applying an emoji conversion deep learning model to the face image and including the emoji conversion deep learning model being preliminarily learned so that a similarity degree between facial feature information of the face image and facial feature information of the emoji image is higher than a predetermined threshold value, and an image inserter configured to insert the emoji image into a database by replacing the emoji image with the face image.

The emoji conversion deep learning model may be a generator of a generative adversarial network (GAN).

The emoji conversion deep learning model may be preliminarily learned so that an identity of a face in the face image cannot be visually distinguished.

According to an exemplary embodiment of the present invention, a learning face image can be protected even when a learning image DB is leaked out by changing a face image to an emoji image including facial feature information.

According to an exemplary embodiment of the present invention, since an emoji image retains face feature information, it can be used as a learning and verification database for development of face recognition technology based deep learning.

DETAILED DESCRIPTION OF THE EMBODIMENTS

Figure 1:
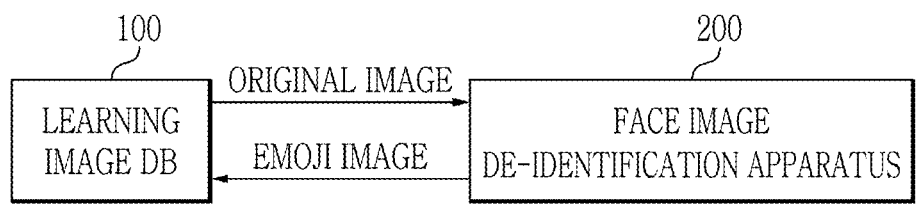
FIG. 1 is a block diagram showing a relationship between a face image de-identification apparatus and a learning image DB according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. When it is described that an element is "connected" to another element, the element may be "directly connected" to the other element or "electrically connected" to the other element through a third element. In addition, unless explicitly described to the contrary, the word "comprise" and variations such as "comprises" or "comprising" will be understood to imply the inclusion of stated elements but not the exclusion of any other elements. Unless explicitly described to the contrary, the word "include" and variations such as "includes" or "including" will be understood to imply the inclusion of stated elements but not the exclusion of any other elements.

The face image de-identification apparatus according to an exemplary embodiment of the present invention generates an emoji which retains facial feature information for use for learning although the identity of the person cannot be identified. This can protect the face image for learning. This face image de-identification apparatus will be described in detail below.

FIG. 1 is a block diagram showing a relationship between a face image de-identification apparatus and a learning image DB according to an exemplary embodiment of the present invention.

A learning image database (DB) 100 is a database for storing data on images used for deep learning. The learning image DB 100 stores a plurality of images including a face image.

A face image de-identification apparatus 200 extracts an original image from the learning image DB 100, extracts a person from the extracted original image, and extracts a face image by detecting only a face region containing personal information from the extracted person. Then, the face image de-identification apparatus 200 generates an emoji image to replace the face using the extracted face image, and inserts the generated emoji image into the learning image DB 100.

Figure 2:
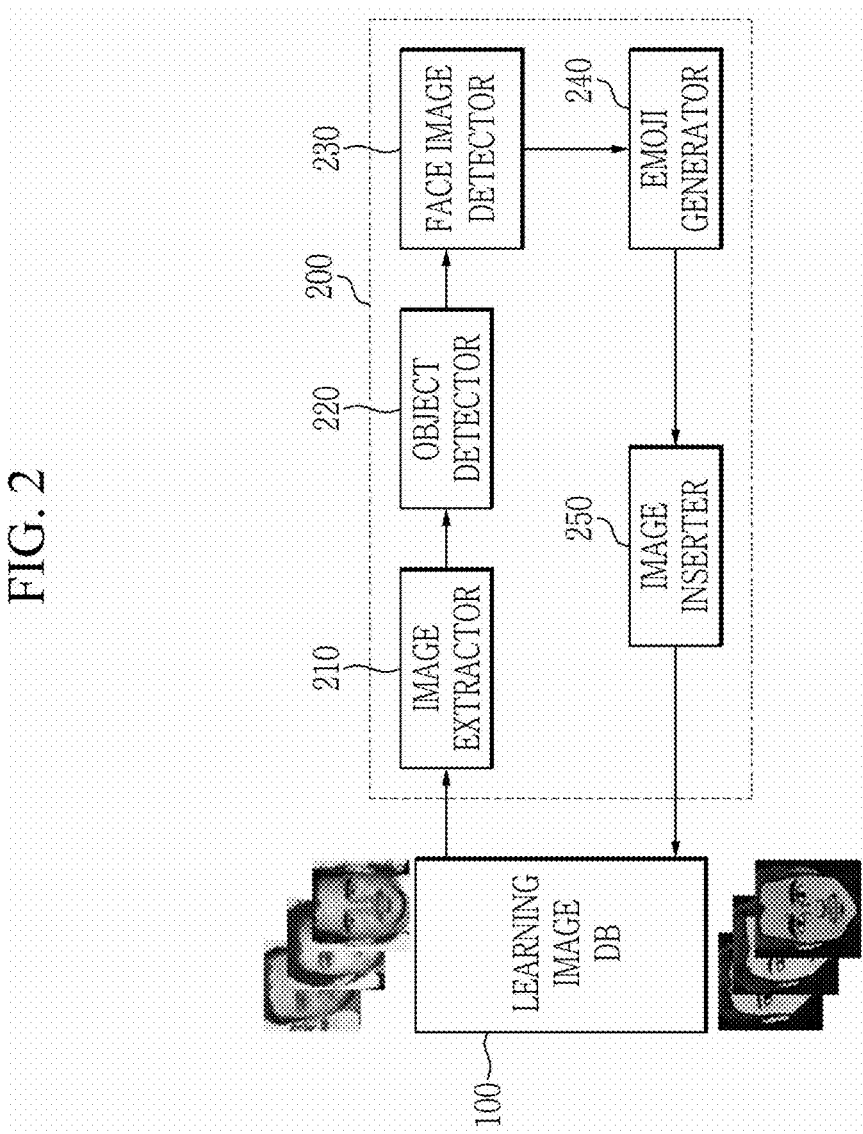
FIG. 2 is a block diagram showing a face image de-identification apparatus according to an exemplary embodiment of the present invention.

FIG. 2 is a block diagram showing a face image de-identification apparatus 200 according to an exemplary embodiment of the present invention.

As shown in FIG. 2, the face image de-identification apparatus 200 according to the exemplary embodiment of the present invention includes an image extractor 210, an object detector 220, a face image detector 230, an emoji generator 240, and an image inserter 250.

The image extractor 210 extracts an original image from the learning image DB 100. Here, the original image is image data including an image of a person's face.

The object detector 220 detects only an image of a person who is an object in the original image extracted by the image extractor 210. That is, the object detector 220 detects only the human image portion in the original image. The method by which the object detector 220 detects a person is known to those skilled in the art, and a detailed description thereof will be omitted.

The face image detector 230 detects only an image of a face in the human image detected by the object detector 220. That is, the face image detector 230 detects only the face image portion in the human image. The method of detecting the face image by the face image detector 230 is known to those skilled in the art, and a detailed description thereof will be omitted.

Meanwhile, if the learning image DB 100 stores only the face image itself, the image extractor 210 can directly extract the face image from the learning image DB 100. In this case, the object detector 220 and the face image detector 230 may be omitted.

The emoji generator 240 generates an emoji image for replacing a face using the face image extracted by the face image detector 230. The emoji generator 240 generates an emoji image in such a manner that only important facial features of the face image are visually emphasized. The emoji generator 240 generates the emoji image so that the feature information of the face image (position of eyes, nose, mouth, spacing therebetween, etc.) is maximized from the viewpoint of a face recognizer. Then, the emoji generator 240 generates the emoji image such that the face image and the generated emoji image are recognized as the same face by the face recognizer. The emoji generator 240 is implemented based on a deep learning network, which will be described in detail with reference to FIG. 3 below.

The image inserter 250 receives the emoji image generated by the emoji generator 240, and inserts the received emoji image into the original image of the learning image DB 100.

In this way, the learning image DB 100 in which the emoji image is inserted does not cause a privacy invasion problem in the outflow of the learning image DB 100 because the emoji image is substituted for the real face image of the person. Also, since the inserted emoji image retains the facial feature information, it can be used as a learning and verification DB for development of face recognition technology based deep learning. That is, since the emoji image according to the exemplary embodiment of the present invention cannot visually identify the identity of the person while maintaining the facial feature information of the person, it can be used for the deep-learning image recognition technology based on the face recognition.

As described above, the emoji generator 240 according to the exemplary embodiment of the present invention is implemented in advance based on the deep learning network. The emoji image generator 240 adaptively learns the deep learning network for an n reference image so that the feature information of the face image and the feature information of the generated emoji image have approximate values. Here, the n reference face images are images that have already been disclosed from the outside and do not require confidentiality. The emoji generator 240 can generate an emoji image having similarity with the reference face image by sequentially learning n reference face images in advance. That is, the emoji generator 240 can preliminarily configure the emoji conversion deep learning model so that it cannot visually recognize the original face image from the emoji image but can recognize it as the same face through the face recognizer.

A method of configuring the emoji conversion deep learning model by the emoji generator 240 will now be described in detail with reference to FIG. 3.

Figure 3:
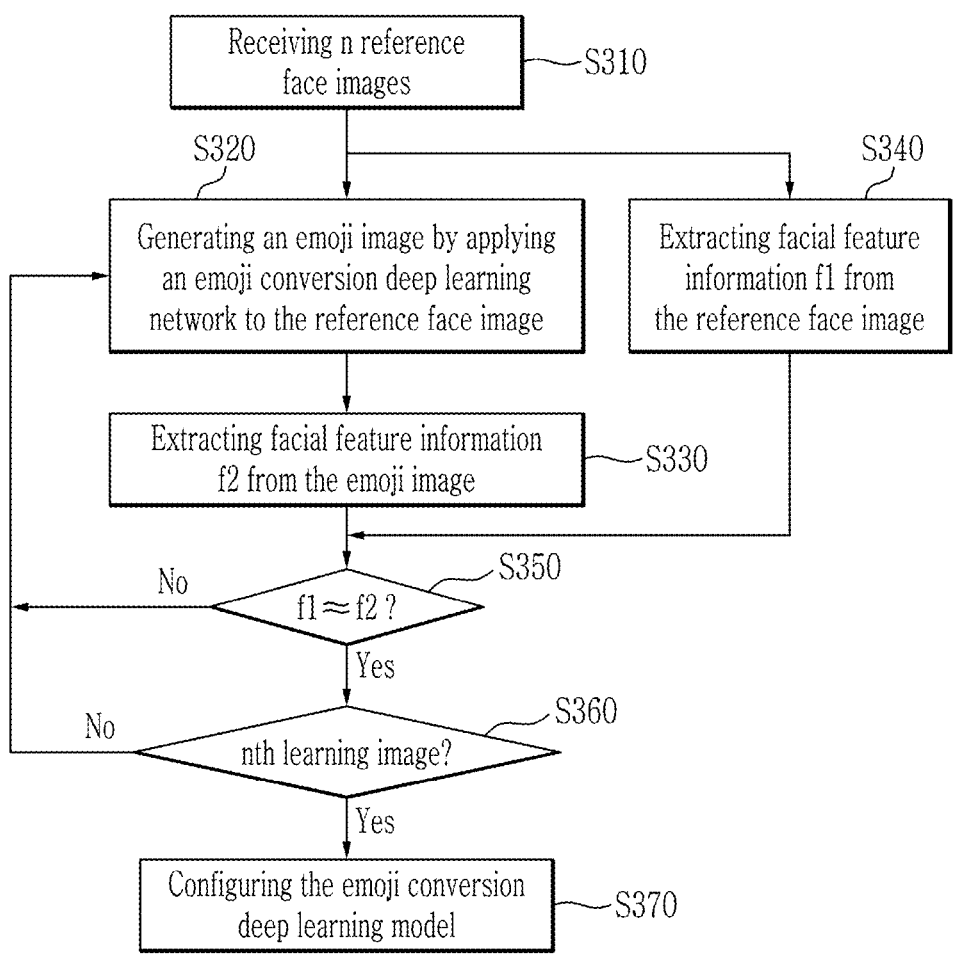
FIG. 3 is a flowchart showing a method of configuring the emoji conversion deep learning model by the emoji generator according to an exemplary embodiment of the present invention.

FIG. 3 is a flowchart showing a method of configuring the emoji conversion deep learning model by the emoji generator 240 according to an exemplary embodiment of the present invention.

First, the emoji generator 240 receives n reference face images (S310). Here, the n reference face images are images that have already been exposed from the outside and do not require confidentiality, and the emoji conversion deep learning model can be constructed in advance through the n reference face images.

The emoji generator 240 generates an emoji image by applying an emoji conversion deep learning network to the first reference face image among the n reference face images inputted in step S310 (S320). Here, the emoji conversion deep learning network may be a generator, which is a component of a generative adversarial network (GAN). The GAN consists of a generator and a discriminator, and the generator generates a fake image similar to a real one. The generator receives the reference face image and outputs the emoji image.

The emoji generator 240 extracts facial feature information f2 from the emoji image generated in step S320 (S330). The facial feature information may be information used to discriminate a face, such as a position of eyes, nose, and mouth, and spacing therebetween. The method for extracting facial feature information will be apparent to those skilled in the art and will not be described in detail herein.

The emoji generator 240 extracts facial feature information f1 from the first reference face image (S340). That is, the emoji generator 240 extracts facial feature information from the reference face image, which is an actual face image. The facial feature information extracted from the reference face image and the facial feature information extracted from the emoji image may be the same (for example, an interval between eyes), but the values may be different from each other.

The emoji generator 240 compares the facial feature information f1 extracted in S340 with the facial feature information f2 extracted in S330, calculates the similarity, and determines whether the similarity degree is higher than a predetermined threshold value (S350). The method for calculating the degree of similarity is known to those skilled in the art, and a detailed description thereof will be omitted herein. A discriminator of the GAN described above can be used in one of the methods of calculating the similarity by comparing the two pieces of facial feature information.

If the degree of similarity is lower than the predetermined threshold value in S350, the emoji generator 240 repeats S320, S330, and S350.

The emoji generator 240 performs S320, S330, S340, and S350 for all of the n reference face images (S360). The emoji generator 240 completes the emoji conversion deep learning model configuration when the steps S320, S330, S340, and S350 are performed until the nth learning image (S370).

The emoji conversion deep learning model is applied to the emoji generator 240, and the emoji generator 240 generates an emoji image of which the face cannot be visually distinguished, while retaining the facial feature information.

Figure 4:
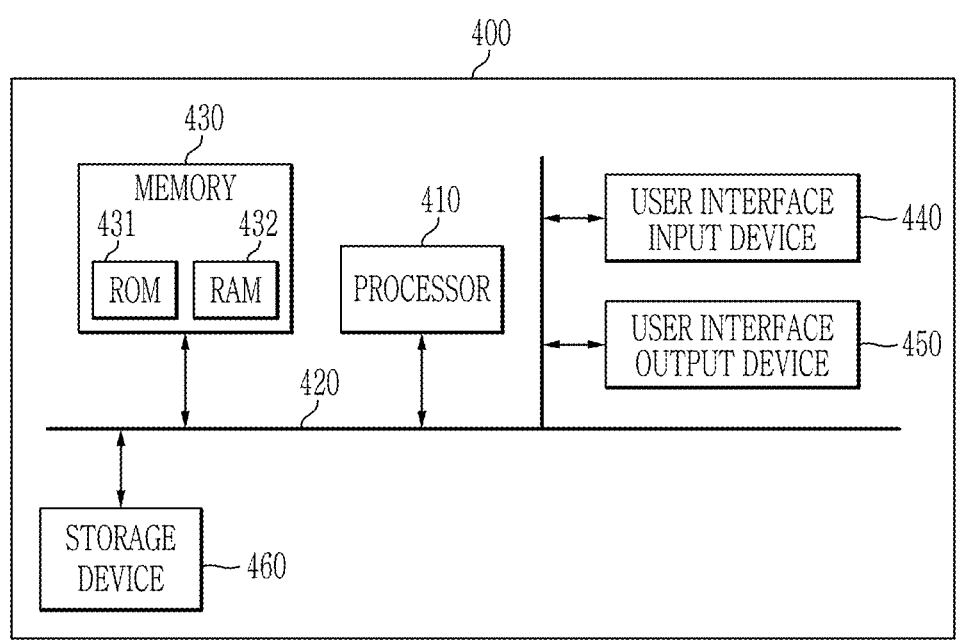
FIG. 4 is a diagram showing a computing system according to an exemplary embodiment of the present invention.

FIG. 4 is a diagram showing a computing system 400 according to an exemplary embodiment of the present invention.

The face image de-identification apparatus 200 according to the exemplary embodiment of the present invention may be implemented in the computer system 400 of FIG. 4. Each component of face image de-identification apparatus 200 may also be implemented in the computer system 400 of FIG. 4.

The computer system 400 includes at least one of a processor 410, a memory 430, a user interface input device 440, a user interface output device 450, and a storage device 460, that communicate via a bus 420.

The processor 410 may be a central processing (CPU) or a semiconductor device that executes instructions stored in the memory 430 or the storage device 460. The processor 410 may be configured to implement the functions and methods described in FIG. 1 to FIG. 3.

The memory 430 and the storage device 460 may include various forms of volatile or non-volatile storage media. For example, the memory 430 may include a read only memory (ROM) 431 or a random access memory (RAM) 432. In an exemplary embodiment of the present invention, the memory 430 may be located inside or outside the processor 410, and the memory 430 may be coupled to the processor 410 through various already-known means.

Thus, the exemplary embodiments of the present invention may be implemented as a method embodied in a computer, or as a non-transitory computer readable medium having computer-executable instructions stored thereon. In an embodiment of the present invention, when executed by a processor, the computer readable instructions may perform a method according to at least one aspect of the present disclosure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A face image de-identification apparatus comprising a processor configured to implement:
   an emoji generator configured to generate a first emoji image including facial feature information corresponding to a face image stored in a database; and
   an image inserter configured to insert the first emoji image into the database by replacing the face image with the first emoji image, wherein:
   the emoji generator comprises an emoji conversion deep learning model for generating the first emoji image using the face image,
   a second emoji image is generated by applying an emoji conversion deep learning network to a reference face image, and
   the emoji conversion deep learning model is constructed by learning the emoji conversion deep learning network so that a similarity degree between facial feature information corresponding to the second emoji image and facial feature information corresponding to the reference face image is higher than a predetermined threshold value.

2. The face image de-identification apparatus of claim 1, wherein:
   the emoji conversion deep learning network is a generator of a generative adversarial network (GAN).

3. The face image de-identification apparatus of claim 1, wherein, the processor is further configured to implement:
   an image extractor configured to extract an original image from the database;
   an object detector configured to detect an image of a person who is an object in the original image; and
   a face image detector configured to detect the face image from the image of the person.

4. The face image de-identification apparatus of claim 1, wherein:
   the reference face image has been disclosed from outside.

5. A method for de-identifying a face image by a face image de-identification apparatus, the method comprising:
   constructing an emoji conversion deep learning model to generate a first emoji image including facial feature information corresponding to the face image;
   generating the first emoji image by applying the emoji conversion deep learning model to the face image; and
   replacing the face image with the first emoji image, where, the constructing the emoji conversion deep learning model comprises:
      generating a second emoji image by applying an emoji conversion deep learning network to a reference face image;
      extracting facial feature information corresponding to the second emoji image;
      extracting facial feature information corresponding to the reference face image;
      calculating a similarity degree between the facial feature information of the second emoji image and the facial feature information of the reference face image; and
      learning the emoji conversion deep learning network until the similarity degree becomes higher than a predetermined threshold value.

6. The method of claim 5, wherein:
   the emoji conversion deep learning network is a generator of a generative adversarial network (GAN).

7. The method of claim 5, wherein:
   the calculating the similarity degree comprises calculating the similarity degree by applying a discriminator of a generative adversarial network (GAN).

8. The method of claim 5, further comprising:
   extracting an original image from a database;
   detecting an image of a person who is an object in the original image; and
   detecting the face image from the image of the person.

9. A face image de-identification apparatus for de-identifying a face image, the face image de-identification apparatus comprising a processor configured to implement:
   an emoji generator configured to generate an emoji image by applying an emoji conversion deep learning model to the face image where the emoji conversion deep learning model is preliminarily learned so that a similarity degree between facial feature information of the face image and facial feature information of the emoji image is higher than a predetermined threshold value; and
   an image inserter configured to insert the emoji image into a database by replacing the face image with the emoji image.

10. The face image de-identification apparatus of claim 9, wherein:
    the emoji conversion deep learning model is a generator of a generative adversarial network (GAN).

11. The face image de-identification apparatus of claim 9, wherein:
    the emoji conversion deep learning model is preliminarily learned so that an identity of a face in the face image cannot be visually distinguished.

* * * * *